United States Patent
Gou et al.

(10) Patent No.: US 10,555,300 B2
(45) Date of Patent: Feb. 4, 2020

(54) DATA TRANSMISSION METHOD, DATA TRANSMISSION SITE AND COMPUTER STORAGE MEDIUM

(71) Applicant: ZTE Corporation, Shenzhen (CN)

(72) Inventors: Wei Gou, Shenzhen (CN); Yajun Zhao, Shenzhen (CN); Focai Peng, Shenzhen (CN); Xincai Li, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/664,373

(22) Filed: Jul. 31, 2017

(65) Prior Publication Data
US 2017/0347355 A1    Nov. 30, 2017

Related U.S. Application Data

(63) Continuation of application No. PCT/CN2016/070875, filed on Jan. 14, 2016.

(30) Foreign Application Priority Data

Jan. 29, 2015  (CN) .......................... 2015 1 0046875

(51) Int. Cl.
*H04W 72/04* (2009.01)
*H04L 5/00* (2006.01)
*H04W 74/08* (2009.01)

(52) U.S. Cl.
CPC ....... *H04W 72/0446* (2013.01); *H04L 5/0082* (2013.01); *H04W 72/0486* (2013.01)

(58) Field of Classification Search
CPC . H04W 16/14; H04W 72/04; H04W 72/0446; H04W 72/0453; H04W 72/0486; H04W 74/0808; H04W 74/0816; H04L 5/0082
See application file for complete search history.

(56) References Cited

U.S. PATENT DOCUMENTS

| | | | |
|---|---|---|---|
| 9,787,443 B2* | 10/2017 | Damnjanovic | H04L 5/0007 |
| 9,924,509 B2* | 3/2018 | Xu | H04L 5/003 |
| 10,015,092 B2* | 7/2018 | Troan | H04L 45/741 |
| 10,051,660 B2* | 8/2018 | Yerramalli | H04W 16/14 |
| 10,051,662 B2* | 8/2018 | Li | H04W 74/0808 |

(Continued)

FOREIGN PATENT DOCUMENTS

WO    2014064322 A1    5/2014

OTHER PUBLICATIONS

International Search Report for corresponding application No. PCT/CN2016/070875 filed on Jan. 14, 2016; dated Apr. 12, 2015.

(Continued)

*Primary Examiner* — Eric Nowlin
(74) *Attorney, Agent, or Firm* — Cantor Colburn LLP

(57) ABSTRACT

Some embodiments provide a data transmission method and a data transmission site. In the method, a sub-frame occupation strategy is determined after a data transmission site successfully preempts an unlicensed carrier by executing Clear Channel Assessment or Extended Clear Channel Assessment (CCA/eCCA); and data transmission is performed according to the sub-frame occupation strategy.

20 Claims, 4 Drawing Sheets

```
        ┌─────────────────────────────────────────────┐  11
        │  A sub-frame occupation strategy is         │
        │  determined after a data transmission site  │
        │  successfully preempts an unlicensed        │
        │  carrier by executing CCA/eCCA              │
        └─────────────────────────────────────────────┘
                              │
                              ▼
        ┌─────────────────────────────────────────────┐  12
        │  Data transmission is performed according   │
        │  to the sub-frame occupation strategy       │
        └─────────────────────────────────────────────┘
```

(56) References Cited

U.S. PATENT DOCUMENTS

| | | | |
|---|---|---|---|
| 10,080,159 B2* | 9/2018 | Valliappan | H04W 28/08 |
| 10,292,177 B2* | 5/2019 | Wang | H04W 72/1289 |
| 2007/0060155 A1* | 3/2007 | Kahana | H04W 72/085 |
| | | | 455/450 |
| 2009/0129353 A1* | 5/2009 | Ki | H04W 74/0816 |
| | | | 370/338 |
| 2011/0280202 A1* | 11/2011 | Lee | H04L 5/003 |
| | | | 370/329 |
| 2013/0016735 A1* | 1/2013 | De Campos Cartolomeu | |
| | | | H04L 12/413 |
| | | | 370/458 |
| 2013/0163575 A1* | 6/2013 | Pak | H04W 74/0808 |
| | | | 370/338 |
| 2014/0341018 A1 | 11/2014 | Bhushan | |
| 2014/0341207 A1* | 11/2014 | Bhushan | H04W 28/0289 |
| | | | 370/350 |
| 2014/0342745 A1* | 11/2014 | Bhushan | H04W 28/0289 |
| | | | 455/450 |
| 2014/0362780 A1 | 12/2014 | Malladi | |
| 2015/0023315 A1* | 1/2015 | Yerramalli | H04W 74/002 |
| | | | 370/330 |
| 2015/0092703 A1* | 4/2015 | Xu | H04L 5/003 |
| | | | 370/329 |
| 2015/0092758 A1* | 4/2015 | Chen | H04W 16/14 |
| | | | 370/336 |
| 2015/0098412 A1* | 4/2015 | Yerramalli | H04W 16/14 |
| | | | 370/329 |
| 2015/0349931 A1* | 12/2015 | Damnjanovic | H04L 5/0007 |
| | | | 370/280 |
| 2016/0309511 A1* | 10/2016 | Li | H04W 74/0808 |
| 2016/0345360 A1* | 11/2016 | Papaleo | H04W 74/08 |
| 2016/0360525 A1* | 12/2016 | Cheng | H04L 5/001 |
| 2017/0048718 A1* | 2/2017 | Kim | H04W 56/0005 |
| 2017/0150500 A1* | 5/2017 | Ahn | H04W 28/02 |
| 2017/0164384 A1* | 6/2017 | Wang | H04L 5/0053 |
| 2017/0208477 A1* | 7/2017 | Hampel | H04W 16/14 |
| 2017/0230986 A1* | 8/2017 | Moon | H04W 74/08 |
| 2017/0325253 A1* | 11/2017 | Wang | H04L 27/04 |
| 2017/0347355 A1* | 11/2017 | Gou | H04L 5/0082 |
| 2018/0027418 A1* | 1/2018 | Li | H04W 16/14 |
| | | | 370/329 |
| 2018/0124834 A1* | 5/2018 | Salem | H04W 72/0446 |
| 2018/0139781 A1* | 5/2018 | Park | H04W 74/0808 |
| 2018/0139782 A1* | 5/2018 | Sadek | H04W 74/0808 |
| 2018/0146498 A1* | 5/2018 | Sahlin | H04W 56/0005 |
| 2018/0167942 A1* | 6/2018 | Xu | H04L 5/003 |
| 2018/0192442 A1* | 7/2018 | Li | H04W 74/08 |
| 2018/0234965 A1* | 8/2018 | Ahn | H04W 28/26 |
| 2018/0234988 A1* | 8/2018 | Shimezawa | H04W 16/14 |
| 2018/0279211 A1* | 9/2018 | Lunttila | H04W 48/16 |
| 2018/0288805 A1* | 10/2018 | Bhorkar | H04L 5/0048 |
| 2018/0295004 A1* | 10/2018 | Gou | H04W 74/0808 |
| 2018/0352573 A1* | 12/2018 | Yang | H04W 16/14 |
| 2018/0352574 A1* | 12/2018 | Li | H04W 74/00 |
| 2018/0367282 A1* | 12/2018 | Li | H04L 1/1896 |
| 2019/0021105 A1* | 1/2019 | Hamidi-Sepehr | H04W 72/14 |
| 2019/0045528 A1* | 2/2019 | Xu | H04W 72/0446 |
| 2019/0053222 A1* | 2/2019 | Bhorkar | H04W 16/14 |
| 2019/0150165 A1* | 5/2019 | Wang | H04W 72/1289 |
| | | | 370/329 |
| 2019/0150193 A1* | 5/2019 | Harada | H04W 72/0446 |
| 2019/0182865 A1* | 6/2019 | Falahati | H04W 72/0446 |
| 2019/0200379 A1* | 6/2019 | Wang | H04W 72/1289 |
| 2019/0200386 A1* | 6/2019 | Yang | H04W 74/08 |

OTHER PUBLICATIONS

Alcatel-Lucent Shanghai, "LBT Enhancements for Licensed-Assited Access", 3GPP Draft, 3rd Generation Partnership Project, vol. RAN WG1, No. San Francisco, USA; Nov. 17, 2014, XP050875784.

European Search Report for corresponding application EP16742661; Report dated Jan. 15, 2018.

LG Electronics: "Candidate solutions for LAA Operation", 3GPP Draft, R1-144042, vol. RAN WG1, No. Ljubljana, Slovenia, Oct. 6, 2014-Oct. 10, 2014, Oct. 5, 2014, XP050875371.

LG Electronics: "LBT Operation Details and Initial Evaluation Results", 3GPP Draft, R1-144900 LAA LBT, 3rd Generation Partnership Project, vol. RAN WG1, No. San Francisco, USA, Nov. 17, 2014-Nov. 21, 2014, Nov. 17, 2014, XP050875956.

* cited by examiner

DATA TRANSMISSION METHOD, DATA TRANSMISSION SITE AND COMPUTER STORAGE MEDIUM

CROSS REFERENCE TO RELATED APPLICATIONS

This application is a continuation of International Patent Application Number PCT/CN2016/070875 filed on Jan. 14, 2016 which claims priority to Chinese Patent Application Number 201510046875.X filed on Jan. 29, 2015, all of which said applications are herein incorporated by reference in their entirety.

TECHNICAL FIELD

The present disclosure relates to the field of mobile radio communications, and particularly to a data transmission method, a data transmission site and a computer storage medium.

BACKGROUND

In an evolution process of Long Term Evolution (LTE), LTE Release 13 (Rel-13) has started launching research projects in September, 2014. An important project in Rel-13 is use of unlicensed carriers in an LTE system. By such a technology, the LTE system can use currently existing unlicensed carriers, so that a potential spectrum resource of the LTE system is greatly improved, thereby achieving lower spectrum cost for the LTE system.

In addition, an unlicensed spectrum also has many advantages, for example:

1: no charge/low cost (it is unnecessary to purchase the unlicensed spectrum, and the spectrum resource is cost-free);

2: low access requirement and cost (individuals and enterprises may all participate in deployment of the unlicensed spectrum, and equipment of an equipment manufacturer may freely access the unlicensed spectrum);

3: shared resources (when multiple different systems operate in the unlicensed spectrum or different operating companies of the same system operate in the unlicensed spectrum, some resource sharing manners may be considered to improve spectral efficiency);

4: a variety of radio access technologies (which comply with different communication standards, are difficult to cooperate, and have diversified network topologies);

5: a large number of radio access data transmission sites (there are a large number of users, great difficulties in cooperation, and high overhead for centralized management); and 6: a large number of applications (data shows that multiple services may be operated in the unlicensed spectrum, for example, Machine to Machine (M2M) and Vehicle to Vehicle (V2V)).

Law control requirements of some regions or states may be raised for the utilization of unlicensed carriers. For example, in Europe, when a system operates in unlicensed carriers, a Listen Before Talk (LBT) mechanism may need to be supported, and two frame structure requirements under an LBT requirement are further specified in the control requirements to support data transmission, i.e. Frame-Based Equipment (FBE) and Load-Based Equipment (LBE) manners respectively. For more details please refer to Chapter 4.9 of ETSI EN 301 893 V1.7.1 (2012 June).

A system based on FBE frame structure has the following characteristics:

simplicity for implementation is achieved, and a fixed time length is occupied every time;

even though an occupying data transmission site sends no data during the frame, other data transmission sites are forbidden to use this frame;

a probability of occurrence of an idle sub-frame in a frame is high (because the time length is not determined according to a load), and the idle sub-frame is easy to be preempted by a different system;

there is only one opportunity for Clear Channel Assessment (CCA) in a frame, and a time length of the entire frame may be wasted if the opportunity is missed;

when the data transmission sites are asynchronous, the CCA preemption may be easily interfered, that is, a preemption success probability is low; and when the data transmission sites are synchronous, multiple adjacent data transmission sites are likely to succeed in CCA preemption at the same time and use the resource at the same time, thereby resulting in high interference.

A system based on LBE frame structure has the following characteristics:

a length of a frame is variable, an occupied time length is between 1 ms and 10 ms (according to the latest control requirements), and each preemption is determined by a data transmission site;

CCA may be performed in each sub-frame to increase a preemption opportunity;

Extended Clear Channel Assessment (eCCA) is supported to be executed to solve the problem that multiple adjacent data transmission sites simultaneously preempt and simultaneously use a resource;

the occupied time length is determined according to a load, so that fewer resources are wasted;

a timing-related mechanism (for example, Hybrid Automatic Repeat reQuest (HARQ), uplink scheduling, Acknowledgement (ACK), Primary Synchronization Signal/Secondary Synchronization Signal (PSS/SSS) and Single Frequency Network (SFN)) of existing LTE has a high potential modification requirement; and there are no obvious differences in case of synchrony or asynchrony of the adjacent data transmission sites.

For the characteristics of LBE and FBE, designing a frame structure suitable for data transmission of an LTE system based on either LBE or FBE has certain disadvantages, so that it may be suggested to analyze these disadvantages for providing a data transmission solution suitable for the LTE system and meeting regional control requirements.

SUMMARY

Some embodiments of the present disclosure provide a data transmission method, a data transmission site and a computer storage medium, which provide a data transmission solution suitable for an LTE system and meeting regional control requirements.

A first embodiment of the present disclosure provides a data transmission method, which may include the following acts.

A sub-frame occupation strategy is determined after a data transmission site successfully preempts an unlicensed carrier by executing CCA/eCCA.

Data transmission is performed according to the sub-frame occupation strategy.

In the embodiment, each sub-frame of a frame may support CCA/eCCA. After the unlicensed carrier is successfully preempted by executing the CCA/eCCA according to a time sequence in the frame, the maximum number of sub-frames occupied by the data transmission site may be determined to be a smaller value in following two values:

the number of sub-frames till the end of the frame, and the number of sub-frames corresponding to a maximum time length of a single CCA/eCCA required by local control.

The frame may include a frame for data transmission configured by a system, a maximum time length of the frame may be 10 ms, and a minimum time length of the frame may be 1 ms.

In the embodiment, the sub-frame occupation strategy may include one or more of: the number of occupied sub-frames, types of occupied sub-frames, a proportion between different types of occupied sub-frames, and positions of occupied sub-frames.

In the embodiment, the data transmission may include receiving data and/or sending data.

In the embodiment, the act that the sub-frame occupation strategy is determined after the data transmission site successfully preempts the unlicensed carrier by executing the CCA/eCCA may include the following act.

After the data transmission site successfully preempts the unlicensed carrier by executing the CCA/eCCA in the last sub-frame of a frame, the current sub-frame is determined to be occupied.

In the embodiment, the method may further include that: when an occupation time length requirement of the data transmission site exceeds the last sub-frame of a frame after the data transmission site successfully preempts the unlicensed carrier by executing the CCA/eCCA in a sub-frame of the frame, the data transmission site may execute one of the following acts.

CCA/eCCA is executed in the first sub-frame of a next frame of the frame, and at this moment, the data transmission site executes specific CCA/eCCA with a preemption probability higher than a preemption probability of other data transmission sites.

Remaining sub-frames in a next frame of the frame are directly occupied without executing CCA/eCCA in the remaining sub-frames.

CCA/eCCA is re-executed for preemption in a next frame of the frame by using a preemption probability the same as a preemption probability of other data transmission sites.

In the embodiment, the act that the sub-frame occupation strategy is determined after the data transmission site successfully preempts the unlicensed carrier by executing the CCA/eCCA may include the following act.

When the data transmission site successfully preempts the unlicensed carrier by executing the CCA/eCCA in a sub-frame of a frame and a corresponding number of sub-frames occupied by the data transmission site according to a load requirement does not exceed the frame, the data transmission site occupies the corresponding number of sub-frames according to the load requirement.

In the embodiment, the act that the sub-frame occupation strategy is determined after the data transmission site successfully preempts the unlicensed carrier by executing the CCA/eCCA may include the following act.

After the data transmission site successfully preempts the unlicensed carrier by executing the CCA/eCCA in a sub-frame of a frame, occupied sub-frames are determined, and the number of uplink sub-frames and the number of downlink sub-frames in the occupied sub-frames are determined according to an uplink load requirement and a downlink load requirement.

In the embodiment, when the data transmission site determines that both the number of the uplink sub-frames and the number of the downlink sub-frames are not 0, the downlink sub-frames may be positioned before the uplink sub-frames.

In the embodiment, the act that the sub-frame occupation strategy is determined after the data transmission site successfully preempts the unlicensed carrier by executing the CCA/eCCA may include the following act.

After the data transmission site successfully preempts the unlicensed carrier by executing the CCA/eCCA in a sub-frame of a frame, occupied sub-frames are determined, and the occupied sub-frames are determined to be only downlink sub-frames or only uplink sub-frames.

In the embodiment, the act that the sub-frame occupation strategy is determined after the data transmission site successfully preempts the unlicensed carrier by executing the CCA/eCCA may include the following act. After the data transmission site successfully preempts the unlicensed carrier by executing the CCA/eCCA in a sub-frame of a frame, a downlink signal and/or an uplink signal are/is allowed to be sent in the sub-frame. In the embodiment, resources for sending the downlink signal or the uplink signal may be part or all of time resources in resources of the sub-frame which are obtained by successfully executing the CCA/eCCA, or may be part or all of time resources in the sub-frame except resources obtained by executing the CCA/eCCA.

In the embodiment, the act that the sub-frame occupation strategy is determined after the data transmission site successfully preempts the unlicensed carrier by executing the CCA/eCCA may include the following act. After the data transmission site successfully preempts the unlicensed carrier by executing the CCA/eCCA in a sub-frame of a frame, occupied sub-frames are determined, and the sub-frame occupation strategy is determined to be one of the following sub-frame occupation strategies:

the data transmission site is not required to execute CCA/eCCA before subsequently using the occupied sub-frames;

or, another data transmission site authorized or appointed by the data transmission site is not required to execute CCA/eCCA when using a sub-frame occupied by the data transmission site;

or, when another data transmission site authorized or appointed by the data transmission site uses a sub-frame occupied by the data transmission site, the data transmission site sends signals at front parts of the sub-frame, and the other data transmission site authorized or appointed by the data transmission site sends signals by virtue of rest resources;

or, another data transmission site authorized or appointed by the data transmission site executes specific CCA/eCCA with a preemption probability higher than other data transmission sites when using a sub-frame occupied by the data transmission site.

In the embodiment, CCA/eCCA in each sub-frame of the frame may be started from a starting position of the sub-frame. A total time length allocated for execution of CCA/eCCA may be fixed or configurable. When the total time length allocated for execution of CCA/eCCA is configurable, the total time length may be configured to be 1 to M Orthogonal Frequency Division Multiplexing (OFDM) symbols, where a value of M is any natural number within a range of 4 to 7. When the total time length allocated for execution of CCA/eCCA is fixed, the total time length may be fixed to be 2 or 3 or 4 OFDM symbols.

In the embodiment, the total time length may further include that: when there is remaining time in the total time length after the data transmission site successfully executes CCA/eCCA, the data transmission site sends a channel reserve signal from a successful preemption moment at least to a first subsequent LTE OFDM symbol boundary; or a time length during which the data transmission site sends a channel reserve signal from the successful preemption moment at least to a first subsequent LTE OFDM symbol boundary is smaller than 4 microseconds or 9 microseconds or 18 microseconds or 20 microseconds.

In the embodiment, the method may further include the following act.

The data transmission site determines the occupied sub-frames. The occupied sub-frames may be determined to be: uplink or downlink sub-frames, or a proportion of uplink and downlink sub-frames in the sub-frames occupied by the data transmission site.

In the embodiment, the method may further include the following act.

The data transmission site appoints the occupied sub-frames to be uplink or downlink sub-frames or appoints a proportion and positions of uplink and downlink sub-frames when the occupied sub-frames include both the uplink and downlink sub-frames in advance with subordinate User Equipment (UE) or an appointed user.

In the embodiment, the method may further include the following act. A length of a frame is semi-statically changed, and lengths of the frame for adjacent data transmission sites of the same system are configured to be kept consistent.

In the embodiment, the method may further include the following act. The data transmission site notifies a receiver or a subordinate UE of the sub-frame occupation strategy.

In the embodiment, the act that the data transmission site notifies the receiver or the subordinate UE of the sub-frame occupation strategy may include one of the following acts.

The data transmission site notifies the receiver or the subordinate UE that the sub-frames occupied by the data transmission site are downlink sub-frames or uplink sub-frames, and the receiver or the subordinate UE receives or sends data in the sub-frames occupied by the data transmission site.

Or, the data transmission site notifies the receiver or the subordinate UE of specific uplink sub-frames and downlink sub-frames in the sub-frames occupied by the data transmission site, and the receiver or the subordinate UE uses the corresponding sub-frames for receiving or sending according to a proportion and positions of the notified uplink and downlink sub-frames based on signaling or an appointment.

In the embodiment, the act that the data transmission site notifies the receiver or the subordinate UE of the sub-frame occupation strategy may include the following act. The data transmission site notifies the receiver or the subordinate UE of the sub-frame occupation strategy through bit information in Downlink Control Information (DCI) or Uplink Control Information (UCI).

In the embodiment, the act that the data transmission site notifies the receiver or the subordinate UE of the sub-frame occupation strategy may include the following act. The data transmission site notifies, in the sub-frame where CCA/eCCA is executed, the receiver or the subordinate UE of types of the occupied sub-frames, or a proportion between different types of occupied sub-frames and positions of the occupied sub-frames, or the number of the occupied sub-frames, or information of the unlicensed carrier occupied by the data transmission site.

In the embodiment, the act that the data transmission site notifies the receiver or the subordinate UE of the sub-frame occupation strategy may include the following act. The data transmission site implicitly notifies, through a channel reserve signal or appointed subsequences of one or more of a Dedicated Reference Signal (DRS), PSS/SSS, Cell specific Reference Signal (CRS), Channel State Information Reference Signal (CSI-RS) and Positioning Reference Signal (PRS) sent in the sub-frame where CCA/eCCA is executed, the receiver or the subordinate UE of types of the occupied sub-frames, or a proportion between different types of occupied sub-frames and positions of the occupied sub-frames, or the number of the occupied sub-frames, or information of the unlicensed carrier occupied by the data transmission site.

A second embodiment of the present disclosure provides a data transmission site, which may include: an unlicensed carrier preemption module, a sub-frame occupation strategy determination module and a data transmission module.

The unlicensed carrier preemption module may be configured to preempt an unlicensed carrier by executing CCA/eCCA.

The sub-frame occupation strategy determination module may be configured to determine a sub-frame occupation strategy after the unlicensed carrier preemption module successfully preempts the unlicensed carrier by executing the CCA/eCCA.

The data transmission module may be configured to perform data transmission according to the sub-frame occupation strategy.

In the embodiment, each sub-frame of a frame may support CCA/eCCA. After the unlicensed carrier is successfully preempted by executing the CCA/eCCA according to a time sequence in the frame, the sub-frame occupation strategy determination module may determine that the maximum number of sub-frames occupied by the data transmission site is a smaller value in following two values:

the number of sub-frames till the end of the frame, and the number of sub-frames corresponding to a maximum time length of a single CCA/eCCA required by local control.

The frame may include a frame for data transmission configured by a system, a maximum time length of the frame may be 10 ms, and a minimum time length of the frame may be 1 ms.

In the embodiment, the sub-frame occupation strategy determined by the sub-frame occupation strategy determination module may include one or more of: the number of occupied sub-frames, types of occupied sub-frames, a proportion between different types of occupied sub-frames, and positions of occupied sub-frames.

In the embodiment, the data transmission module may be configured to receive data and/or send data.

In the embodiment, the sub-frame occupation strategy determination module may be configured to, after the unlicensed carrier preemption module successfully preempts the unlicensed carrier by executing the CCA/eCCA in the last sub-frame of a frame, determine to occupy a current sub-frame.

In the embodiment, the unlicensed carrier preemption module may further be configured to, when an occupation time length requirement exceeds the last sub-frame of a frame after the unlicensed carrier is successfully preempted by executing the CCA/eCCA in a sub-frame of the frame, execute one of the following acts.

CCA/eCCA is executed in the first sub-frame of a next frame of the frame, and at this moment, specific CCA/eCCA with a preemption probability higher than a preemption probability of other data transmission sites is executed.

Remaining sub-frames in a next frame of the frame are directly occupied without executing CCA/eCCA in the remaining sub-frames.

CCA/eCCA is re-executed for preemption in a next frame of the frame by using a preemption probability the same as a preemption probability of other data transmission sites.

In the embodiment, the sub-frame occupation strategy determination module may be configured to, when the unlicensed carrier preemption module successfully preempts the unlicensed carrier by executing the CCA/eCCA in a sub-frame of a frame and a corresponding number of sub-frames occupied by the data transmission site according to a load requirement does not exceed the frame, determine to occupy the corresponding number of sub-frames according to the load requirement.

In the embodiment, the sub-frame occupation strategy determination module may be configured to, after the unlicensed carrier preemption module successfully preempts the unlicensed carrier by executing the CCA/eCCA in a sub-frame of a frame, determine occupied sub-frames and determine the number of uplink sub-frames and the number of downlink sub-frames in the occupied sub-frames according to an uplink load requirement and a downlink load requirement.

In the embodiment, when the sub-frame occupation strategy determination module determines that both the number of the uplink sub-frames and the number of the downlink sub-frames are not 0, the downlink sub-frames may be positioned before the uplink sub-frames.

In the embodiment, the sub-frame occupation strategy determination module may be configured to, after the unlicensed carrier preemption module successfully preempts the unlicensed carrier by executing the CCA/eCCA in a sub-frame of a frame, determine occupied sub-frames and determine the occupied sub-frames to be only downlink sub-frames or only uplink sub-frames.

In the embodiment, the sub-frame occupation strategy determination module may be configured to, after the unlicensed carrier preemption module successfully preempts the unlicensed carrier by executing the CCA/eCCA in a sub-frame of a frame, determine that a downlink signal and/or an uplink signal are/is allowed to be sent in the sub-frame. Resources for sending the downlink signal or the uplink signal may be part or all of time resources in resources of the sub-frame which are obtained by successfully executing the CCA/eCCA, or may be part or all of time resources in the sub-frame except resources obtained by executing the CCA/eCCA.

In the embodiment, the sub-frame occupation strategy determination module may be configured to, after the unlicensed carrier preemption module successfully preempts the unlicensed carrier by executing the CCA/eCCA in a sub-frame of a frame, determine occupied sub-frames and determine that CCA/eCCA is not required to be executed before the occupied sub-frames are subsequently used; or, determine that another data transmission site authorized or appointed by the data transmission site is not required to execute CCA/eCCA when using a sub-frame occupied by the data transmission site; or, determine that the data transmission site sends signals at front parts of the sub-frame and the other data transmission site authorized or appointed by the data transmission site sends signals by virtue of rest resources when the other data transmission site which is authorized or appointed uses a sub-frame occupied by the data transmission site; or, determine that the other data transmission site which is authorized or appointed executes specific CCA/eCCA with a preemption probability higher than other data transmission sites when using a sub-frame occupied by the data transmission site.

In the embodiment, CCA/eCCA in each sub-frame of the frame may be started from a starting position of the sub-frame. A total time length allocated for execution of CCA/eCCA may be fixed or configurable. When the total time length allocated for execution of CCA/eCCA is configurable, the total time length may be configured to be 1 to M OFDM symbols, where a value of M is any natural number within a range of 4 to 7. When the total time length allocated for execution of CCA/eCCA is fixed, the total time length may be fixed to be 2 or 3 or 4 OFDM symbols.

In the embodiment, the total time length may further include that: when there is remaining time in the total time length after the data transmission site successfully executes CCA/eCCA, the data transmission site sends a channel reserve signal from a successful preemption moment at least to a first subsequent LTE OFDM symbol boundary; or a time length during which the data transmission site sends a channel reserve signal from the successful preemption moment at least to a first subsequent LTE OFDM symbol boundary is smaller than 4 microseconds or 9 microseconds or 18 microseconds or 20 microseconds.

In the embodiment, the sub-frame occupation strategy determination module may be configured to determine occupied sub-frames. The occupied sub-frames may be determined to be: uplink or downlink sub-frames, or a proportion of uplink and downlink sub-frames in the sub-frames occupied by the data transmission site.

In the embodiment, the sub-frame occupation strategy determination module may be configured to determine the occupied sub-frames to be uplink or downlink sub-frames or a proportion and positions of uplink and downlink sub-frames when the occupied sub-frames include both the uplink and downlink sub-frames according to an appointment made in advance between the data transmission site and subordinate UE or an appointed user.

In the embodiment, a length of a frame may be semi-statically changed, and lengths of the frame for adjacent data transmission sites of the same system may be configured to be kept consistent.

In the embodiment, the data transmission site may further include a notification module.

The notification module may be configured to notify a receiver or a subordinate UE of the sub-frame occupation strategy.

In the embodiment, the notification module may be configured to notify the receiver or the subordinate UE that the sub-frames occupied by the data transmission site are downlink sub-frames or uplink sub-frames, the receiver or the subordinate UE receiving or sending data in the sub-frames occupied by the data transmission site; or, notify the receiver or the subordinate UE of specific uplink sub-frames and downlink sub-frames in the sub-frames occupied by the data transmission site, the receiver or the subordinate UE using the corresponding sub-frames for receiving or sending according to a proportion and positions of the notified uplink and downlink sub-frames based on signaling or an appointment.

In the embodiment, the notification module may be configured to notify the receiver or the subordinate UE of the sub-frame occupation strategy through bit information in DCI or UCI.

In the embodiment, the notification module may be configured to notify, in the sub-frame where CCA/eCCA is executed, the receiver or the subordinate UE of types of the occupied sub-frames, or a proportion between different types of occupied sub-frames and positions of the occupied sub-frames, or the number of the occupied sub-frames, or information of the unlicensed carrier occupied by the data transmission site.

In the embodiment, the notification module may be configured to implicitly notify, through a channel reserve signal or appointed subsequences of one or more of a DRS, PSS/SSS, CRS, CSI-RS and PRS sent in the sub-frame where CCA/eCCA is executed, the receiver or the subordinate UE of types of the occupied sub-frames, or a proportion between different types of occupied sub-frames and positions of the occupied sub-frames, or the number of the occupied sub-frames, or information of the unlicensed carrier occupied by the data transmission site.

A third embodiment of the present disclosure provides a computer storage medium, in which a computer-executable instruction may be stored, the computer-executable instruction being configured to execute at least one of the above-mentioned data transmission methods.

According to the data transmission method, data transmission site and computer storage medium of some embodiments of the present disclosure, the sub-frame occupation strategy is determined after the data transmission site successfully preempts the unlicensed carrier by executing the CCA/eCCA, and data transmission is performed according to the sub-frame occupation strategy. In the embodiments of the present disclosure, a constraint of a frame of FBE is taken into consideration, so that a parameter related to a timeslot in the frame may continue adopting a design of an LTE system, and simplicity for implementation is further ensured. In addition, by virtue of the solution of some embodiments of the present disclosure, the problem of boundary constraint of the frame of the FBE is also solved, and characteristics of LBE are maximally supported, so that related advantages of the LBE are achieved, and few resources are wasted. Furthermore, a concept of integrated uplink and downlink design is applied in the embodiments of the present disclosure, so that the solution may be adopted for both uplink and downlink.

DETAILED DESCRIPTION OF THE EMBODIMENTS

Preferred embodiments of the present disclosure will be described below in detail with reference to the drawings. It should be understood that the preferred embodiments described below are only adopted to describe and explain the present disclosure and not intended to limit the present disclosure.

Figure 1:
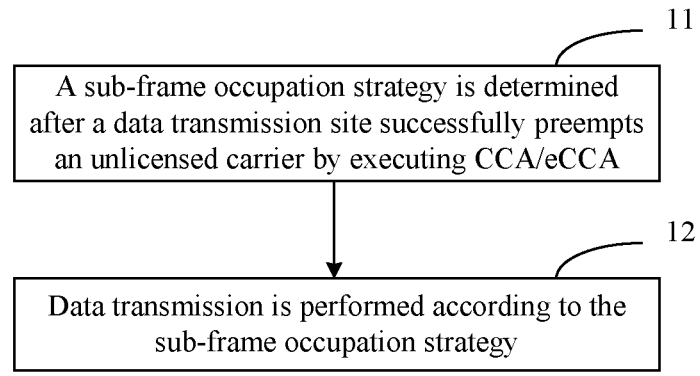
FIG. 1 is a flowchart of a data transmission method according to an embodiment of the present disclosure.

FIG. 1 is a flowchart of a data transmission method according to an embodiment of the present disclosure. As shown in FIG. 1, the method may include the following acts.

At act 11, a sub-frame occupation strategy is determined after a data transmission site successfully preempts an unlicensed carrier by executing CCA/eCCA.

At act 12, data transmission is performed according to the sub-frame occupation strategy.

In the embodiment, each sub-frame of a frame supports CCA/eCCA. After the unlicensed carrier is successfully preempted by executing the CCA/eCCA according to a time sequence in the frame, the maximum number of sub-frames occupied by the data transmission site may be determined to be a smaller value in following two values:

the number of sub-frames till the end of the frame, and the number of sub-frames corresponding to a maximum time length of a single CCA/eCCA required by local control.

The frame may include a frame for data transmission configured by a system, a maximum time length of the frame is, for example, 10 ms, and a minimum time length of the frame is, for example, 1 ms. In this embodiment, the above values limit a time length range of the frame.

In the embodiment, the sub-frame occupation strategy may include one or more of: the number of occupied sub-frames, types of occupied sub-frames, a proportion between different types of occupied sub-frames, and positions of occupied sub-frames.

The data transmission may include receiving data and/or sending data.

In the embodiment, the act that the sub-frame occupation strategy is determined after the data transmission site successfully preempts the unlicensed carrier by executing the CCA/eCCA may include the following act.

After the data transmission site successfully preempts the unlicensed carrier by executing the CCA/eCCA in the last sub-frame of a frame, the current sub-frame is determined to be occupied.

In the embodiment, when an occupation time length requirement of the data transmission site exceeds the last sub-frame of a frame after the data transmission site successfully preempts the unlicensed carrier by executing the CCA/eCCA in a sub-frame of the frame, the data transmission site executes one of the following acts.

CCA/eCCA is executed in the first sub-frame of a next frame of the frame, and at this moment, the data transmission site executes specific CCA/eCCA with a preemption probability higher than a preemption probability of other data transmission sites.

Remaining sub-frames in a next frame of the frame are directly occupied without executing CCA/eCCA in the remaining sub-frames.

CCA/eCCA is re-executed for preemption in a next frame of the frame by using a preemption probability the same as a preemption probability of other data transmission sites.

In the embodiment, the act that the sub-frame occupation strategy is determined after the data transmission site successfully preempts the unlicensed carrier by executing the CCA/eCCA may include the following act.

When the data transmission site successfully preempts the unlicensed carrier by executing the CCA/eCCA in a sub-frame of a frame and a corresponding number of sub-frames occupied by the data transmission site according to a load requirement does not exceed the frame, the data transmission site occupies the corresponding number of sub-frames according to the load requirement.

In the embodiment, the act that the sub-frame occupation strategy is determined after the data transmission site successfully preempts the unlicensed carrier by executing the CCA/eCCA may include the following act.

After the data transmission site successfully preempts the unlicensed carrier by executing the CCA/eCCA in a sub-frame of a frame, occupied sub-frames are determined, and the number of uplink sub-frames and the number of downlink sub-frames in the occupied sub-frames are determined according to an uplink load requirement and a downlink load requirement.

Here, after successfully executing CCA/eCCA to preempt the unlicensed carrier in a sub-frame of a frame, the data transmission site may directly determine to exclusively occupy the current frame, and may alternatively determine not to exclusively occupy the current frame but occupy sub-frames according to a practical load requirement. In addition, in a scenario where the data transmission site exclusively occupies the current frame, if there are still idle sub-frames in the current frame after the data transmission site occupies the sub-frames in the current frame according to the practical load requirement, these idle sub-frames are still idle, and are not allowed to be occupied by another data transmission site. In a scenario where the data transmission site does not exclusively occupy the current frame, if there are still idle sub-frames in the current frame after the data transmission site occupies the sub-frames in the current frame according to the practical load requirement, these idle sub-frames may be occupied by the other data transmission site.

In the embodiment, when the data transmission site determines that both the number of the uplink sub-frames and the number of the downlink sub-frames are not 0, the downlink sub-frames are positioned before the uplink sub-frames.

In the embodiment, the act that the sub-frame occupation strategy is determined after the data transmission site successfully preempts the unlicensed carrier by executing the CCA/eCCA may include the following act.

After the data transmission site successfully preempts the unlicensed carrier by executing the CCA/eCCA in a sub-frame of a frame, occupied sub-frames are determined, and the occupied sub-frames are determined to be only downlink sub-frames or only uplink sub-frames.

In the embodiment, the act that the sub-frame occupation strategy is determined after the data transmission site successfully preempts the unlicensed carrier by executing the CCA/eCCA may include the following act. After the data transmission site successfully preempts the unlicensed carrier by executing the CCA/eCCA in a sub-frame of a frame, a downlink signal and/or an uplink signal are/is allowed to be sent in the sub-frame. Resources for sending the downlink signal or the uplink signal are part or all of time resources in resources of the sub-frame which are obtained by successfully executing the CCA/eCCA, or are part or all of time resources in the sub-frame except resources obtained by executing the CCA/eCCA.

In the embodiment, the act that the sub-frame occupation strategy is determined after the data transmission site successfully preempts the unlicensed carrier by executing the CCA/eCCA may include the following act. After the data transmission site successfully preempts the unlicensed carrier by executing the CCA/eCCA in a sub-frame of a frame, occupied sub-frames are determined, and the sub-frame occupation strategy is determined to be one of the following sub-frame occupation strategies:

the data transmission site is not required to execute CCA/eCCA before subsequently using the occupied sub-frames;

or, another data transmission site authorized or appointed by the data transmission site is not required to execute CCA/eCCA when using a sub-frame occupied by the data transmission site;

or, when another data transmission site authorized or appointed by the data transmission site uses a sub-frame occupied by the data transmission site, the data transmission site sends signals at front parts of the sub-frame, and the other data transmission site authorized or appointed by the data transmission site sends signals by virtue of rest resources;

or, another data transmission site authorized or appointed by the data transmission site executes specific CCA/eCCA with a preemption probability higher than other data transmission sites when using a sub-frame occupied by the data transmission site.

In the embodiment, CCA/eCCA in each sub-frame of the frame is started from a starting position of the sub-frame. A total time length allocated for execution of CCA/eCCA is fixed or is configurable. When the total time length allocated for execution of CCA/eCCA is configurable, the total time length is configured to be 1 to M OFDM symbols, where a value of M is any natural number within a range of 4 to 7. When the total time length allocated for execution of CCA/eCCA is fixed, the total time length is fixed to be 2 or 3 or 4 OFDM symbols.

In the embodiment, the total time length further includes that: when there is remaining time in the total time length after the data transmission site successfully executes CCA/eCCA, the data transmission site sends a channel reserve signal from a successful preemption moment at least to a first subsequent LTE OFDM symbol boundary; or a time length during which the data transmission site sends a channel reserve signal from the successful preemption moment at least to a first subsequent LTE OFDM symbol boundary is smaller than 4 microseconds or 9 microseconds or 18 microseconds or 20 microseconds.

In the embodiment, the method may further include the following act.

The data transmission site determines the occupied sub-frames. The occupied sub-frames may be determined to be: uplink or downlink sub-frames, or a proportion of uplink and downlink sub-frames in the sub-frames occupied by the data transmission site.

In the embodiment, the method may further include the following act.

The data transmission site appoints the occupied sub-frames to be uplink or downlink sub-frames or appoints a proportion and positions of uplink and downlink sub-frames when the occupied sub-frames include both the uplink and downlink sub-frames in advance with subordinate UE or an appointed user.

In the embodiment, the method may further include the following act. A length of a frame is semi-statically changed, and lengths of the frame for adjacent data transmission sites of the same system are configured to be kept consistent.

In the embodiment, the method may further include the following act. The data transmission site notifies a receiver or a subordinate UE of the sub-frame occupation strategy.

In the embodiment, the act that the data transmission site notifies the receiver or the subordinate UE of the sub-frame occupation strategy may include one of the following acts.

The data transmission site notifies the receiver or the subordinate UE that the sub-frames occupied by the data transmission site are downlink sub-frames or uplink sub-frames, and the receiver or the subordinate UE receives or sends data in the sub-frames occupied by the data transmission site.

Or, the data transmission site notifies the receiver or the subordinate UE of specific uplink sub-frames and downlink sub-frames in the sub-frames occupied by the data transmission site, and the receiver or the subordinate UE uses the corresponding sub-frames for receiving or sending according to a proportion and positions of the notified uplink and downlink sub-frames based on signaling or an appointment.

In the embodiment, the act that the data transmission site notifies the receiver or the subordinate UE of the sub-frame occupation strategy may include the following act. The data transmission site notifies the receiver or the subordinate UE of the sub-frame occupation strategy through bit information in DCI or UCI.

In the embodiment, the act that the data transmission site notifies the receiver or the subordinate UE of the sub-frame occupation strategy may include the following act. The data transmission site notifies, in the sub-frame where CCA/eCCA is executed, the receiver or the subordinate UE of types of the occupied sub-frames, or a proportion between different types of occupied sub-frames and positions of the occupied sub-frames, or the number of the occupied sub-frames, or information of the unlicensed carrier occupied by the data transmission site.

In the embodiment, the act that the data transmission site notifies the receiver or the subordinate UE of the sub-frame occupation strategy may include the following act. The data transmission site implicitly notifies, through a channel reserve signal or appointed subsequences of one or more of a DRS, PSS/SSS, CRS, CSI-RS and PRS sent in the sub-frame where CCA/eCCA is executed, the receiver or the subordinate UE of types of the occupied sub-frames, or a proportion between different types of occupied sub-frames and positions of the occupied sub-frames, or the number of the occupied sub-frames, or information of the unlicensed carrier occupied by the data transmission site.

Figure 2:
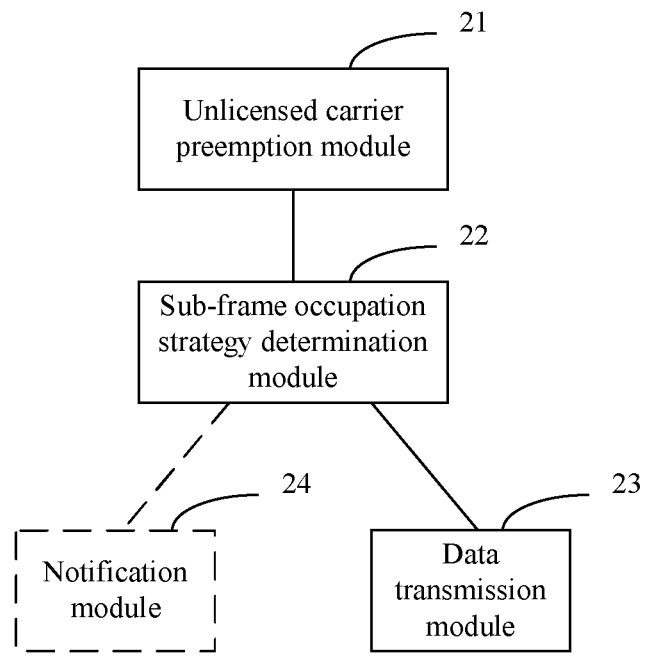
FIG. 2 is a structure diagram of a data transmission site according to an embodiment of the present disclosure.

An embodiment of the present disclosure also correspondingly discloses a data transmission site. As shown in FIG. 2, the data transmission site includes: an unlicensed carrier preemption module 21, a sub-frame occupation strategy determination module 22 and a data transmission module 23.

The unlicensed carrier preemption module 21 is configured to preempt an unlicensed carrier by executing CCA/eCCA.

The sub-frame occupation strategy determination module 22 is configured to determine a sub-frame occupation strategy after the unlicensed carrier preemption module 21 successfully preempts the unlicensed carrier by executing the CCA/eCCA.

The data transmission module 23 is configured to perform data transmission according to the sub-frame occupation strategy.

In the embodiment, each sub-frame of a frame supports CCA/eCCA. After the unlicensed carrier is successfully preempted by executing the CCA/eCCA according to a time sequence in the frame, the sub-frame occupation strategy determination module 22 determines that the maximum number of sub-frames occupied by the data transmission site is a smaller value in following two values:

the number of sub-frames till the end of the frame, and
the number of sub-frames corresponding to a maximum time length of a single CCA/eCCA required by local control.

The frame may include a frame for data transmission configured by a system, a maximum time length of the frame may be 10 ms, and a minimum time length of the frame may be 1 ms.

In the embodiment, the sub-frame occupation strategy determined by the sub-frame occupation strategy determination module 22 may include one or more of: the number of occupied sub-frames, types of occupied sub-frames, a proportion between different types of occupied sub-frames, and positions of occupied sub-frames.

In the embodiment, the data transmission module 23 may be configured to receive data and/or send data.

In the embodiment, the sub-frame occupation strategy determination module 22 may be configured to, after the unlicensed carrier preemption module 21 successfully preempts the unlicensed carrier by executing the CCA/eCCA in the last sub-frame of a frame, determine to occupy a current sub-frame.

In the embodiment, the unlicensed carrier preemption module 21 may be further be configured to, when an occupation time length requirement exceeds the last sub-frame of a frame after the unlicensed carrier is successfully preempted by executing the CCA/eCCA in a sub-frame of the frame, execute one of the following acts.

CCA/eCCA is executed in the first sub-frame of a next frame of the frame, and at this moment, specific CCA/eCCA with a preemption probability higher than a preemption probability of other data transmission sites is executed.

Remaining sub-frames in a next frame of the frame are directly occupied without executing CCA/eCCA in the remaining sub-frames.

CCA/eCCA is re-executed for preemption in a next frame of the frame by using a preemption probability the same as a preemption probability of other data transmission sites.

In the embodiment, the sub-frame occupation strategy determination module 22 may be configured to, when the unlicensed carrier preemption module 21 successfully preempts the unlicensed carrier by executing the CCA/eCCA in a sub-frame of a frame and a corresponding number of sub-frames occupied by the data transmission site according to a load requirement does not exceed the frame, determine to occupy the corresponding number of sub-frames according to the load requirement.

In the embodiment, the sub-frame occupation strategy determination module 22 may be configured to, after the unlicensed carrier preemption module 21 successfully preempts the unlicensed carrier by executing the CCA/eCCA in a sub-frame of a frame, determine occupied sub-frames and determine the number of uplink sub-frames and the number of downlink sub-frames in the occupied sub-frames according to an uplink load requirement and a downlink load requirement.

In the embodiment, when the sub-frame occupation strategy determination module 22 determines that both the number of the uplink sub-frames and the number of the downlink sub-frames are not 0, the downlink sub-frames may be positioned before the uplink sub-frames.

In the embodiment, the sub-frame occupation strategy determination module 22 may be configured to, after the unlicensed carrier preemption module 21 successfully preempts the unlicensed carrier by executing the CCA/eCCA in a sub-frame of a frame, determine occupied sub-frames and determine the occupied sub-frames to be only downlink sub-frames or only uplink sub-frames.

In the embodiment, the sub-frame occupation strategy determination module 22 may be configured to, after the unlicensed carrier preemption module 21 successfully preempts the unlicensed carrier by executing the CCA/eCCA in a sub-frame of a frame, determine that a downlink signal and/or an uplink signal are/is allowed to be sent in the sub-frame. Resources for sending the downlink signal or the uplink signal are part or all of time resources in resources of the sub-frame which are obtained by successfully executing the CCA/eCCA, or are part or all of time resources in the sub-frame except resources obtained by executing the CCA/eCCA.

In the embodiment, the sub-frame occupation strategy determination module 22 may be configured to, after the unlicensed carrier preemption module 21 successfully preempts the unlicensed carrier by executing the CCA/eCCA in a sub-frame of a frame, determine occupied sub-frames and determine that CCA/eCCA is not required to be executed before the occupied sub-frames are subsequently used; or, determine that another data transmission site authorized or appointed by the data transmission site is not required to execute CCA/eCCA when using a sub-frame occupied by the data transmission site; or, determine that the data transmission site sends signals at front parts of the sub-frame and the other data transmission site authorized or appointed by the data transmission site sends signals by virtue of rest resources when the other data transmission site which is authorized or appointed uses a sub-frame occupied by the data transmission site; or, determine that the other data transmission site which is authorized or appointed executes specific CCA/eCCA with a preemption probability higher than other data transmission sites when using a sub-frame occupied by the data transmission site.

In the embodiment, CCA/eCCA in each sub-frame of the frame is started from a starting position of the sub-frame. A total time length allocated for execution of CCA/eCCA is fixed or is configurable. When the total time length allocated for execution of CCA/eCCA is configurable, the total time length is configured to be 1 to M OFDM symbols, where a value of M is any natural number within a range of 4 to 7. When the total time length allocated for execution of CCA/eCCA is fixed, the total time length is fixed to be 2 or 3 or 4 OFDM symbols.

In the embodiment, the total time length further includes that: when there is remaining time in the total time length after the data transmission site successfully executes CCA/eCCA, the data transmission site sends a channel reserve signal from a successful preemption moment at least to a first subsequent LTE OFDM symbol boundary; or a time length during which the data transmission site sends a channel reserve signal from the successful preemption moment at least to a first subsequent LTE OFDM symbol boundary is smaller than 4 microseconds or 9 microseconds or 18 microseconds or 20 microseconds.

In the embodiment, the sub-frame occupation strategy determination module 22 may be configured to determine the occupied sub-frames. The occupied sub-frames may be determined to be: uplink or downlink sub-frames, or a proportion of uplink and downlink sub-frames in the sub-frames occupied by the data transmission site.

In the embodiment, the sub-frame occupation strategy determination module 22 may be configured to determine the occupied sub-frames to be uplink or downlink sub-frames or a proportion and positions of uplink and downlink sub-frames when the occupied sub-frames include both the uplink and downlink sub-frames according to an appointment made in advance between the data transmission site and subordinate UE or an appointed user.

In the embodiment, a length of a frame is semi-statically changed, and lengths of the frame for adjacent data transmission sites of the same system are configured to be kept consistent.

In the embodiment, referring to FIG. 2, the data transmission site may further include a notification module 24.

The notification module 24 is configured to notify a receiver or a subordinate UE of the sub-frame occupation strategy.

In the embodiment, the notification module 24 may be configured to notify the receiver or the subordinate UE that the sub-frames occupied by the data transmission site are downlink sub-frames or uplink sub-frames, the receiver or the subordinate UE receiving or sending data in the sub-frames occupied by the data transmission site; or, notify the receiver or the subordinate UE of specific uplink sub-frames and downlink sub-frames in the sub-frames occupied by the data transmission site, the receiver or the subordinate UE using the corresponding sub-frames for receiving or sending according to a proportion and positions of the notified uplink and downlink sub-frames based on signaling or an appointment.

In the embodiment, the notification module 24 may be configured to notify the receiver or the subordinate UE of the sub-frame occupation strategy through bit information in DCI or UCI.

In the embodiment, the notification module 24 may be configured to notify, in the sub-frame where CCA/eCCA is executed, the receiver or the subordinate UE of types of the occupied sub-frames, or a proportion between different types of occupied sub-frames and positions of the occupied sub-frames, or the number of the occupied sub-frames, or information of the unlicensed carrier occupied by the data transmission site.

In the embodiment, the notification module 24 may be configured to implicitly notify, through a channel reserve signal or appointed subsequences of one or more of a DRS, PSS/SSS, CRS, CSI-RS and PRS sent in the sub-frame where CCA/eCCA is executed, the receiver or the subordinate UE of types of the occupied sub-frames, or a proportion between different types of occupied sub-frames and positions of the occupied sub-frames, or the number of the occupied sub-frames, or information of the unlicensed carrier occupied by the data transmission site.

It may be appreciated that the data transmission site of the embodiments of the present disclosure may be an evolved Node B, a UE, a home evolved Node B, a relay station and the like.

It may be appreciated that in the embodiment of the present disclosure, after the data transmission site successfully preempts the unlicensed carrier by executing the CCA/eCCA in a sub-frame of a frame, when there is only downlink data sent in the sub-frame, the sub-frame is defined as a downlink sub-frame, and when there is only uplink data in the sub-frame, the sub-frame is defined as an uplink sub-frame. If both uplink data and downlink data simultaneously exist, the sub-frame may be defined to be downlink, and may also be defined to be uplink. If the data transmission site is an evolved Node B, the downlink data refers to any data sent by the evolved Node B, and the uplink data refers to any data (sent to the evolved Node B by the other data transmission site or the UE) received by the evolved Node B. In a sub-frame where CCA/eCCA is executed, there may usually be a channel reserve signal (or retention signal, which functions to occupy a channel to prevent the other data transmission site from preempting the channel), or grant information, or a reference signal or the like.

In the embodiment of the present disclosure, an occupied time length of the data transmission site after the unlicensed carrier is successfully preempted by executing the CCA/eCCA may be calculated to include the sub-frame where CCA/eCCA is executed and include a time length required for executing CCA/eCCA. The time length required for executing CCA/eCCA is actually not a real occupied time length of the data transmission site. However, for convenient description, descriptions are made by taking a sub-frame as a unit in the embodiments of the present disclosure, so that the time length required for executing CCA/eCCA is also included. Actually, the time length required for executing CCA/eCCA may be deleted. After the time length required for executing CCA/eCCA is deleted, the principle of the embodiments of the present disclosure is still applicable.

In the embodiment of the present disclosure, a data transmission site of a radio communication system may be supported to efficiently preempt a resource and use the resource in an unlicensed carrier. A constraint of a frame of FBE is taken into consideration in the embodiment of the present disclosure, so that a parameter related to a timeslot in the frame may continue adopting a design of an LTE system. In addition, a solution for breaking a boundary constraint of the frame of the FBE is also provided, and characteristics of LBE are maximally supported, so that related advantages of the LBE are achieved. Furthermore, a concept of integrated uplink and downlink design is applied in the solution, so that the solution may be adopted for both uplink and downlink.

Implementation modes of the present disclosure will be described below in detail with reference to embodiments, so as to make an implementation process of solving the solution and achieving an effect by technical means in the present disclosure completely understood and accordingly implemented.

First Embodiment

Figure 3:
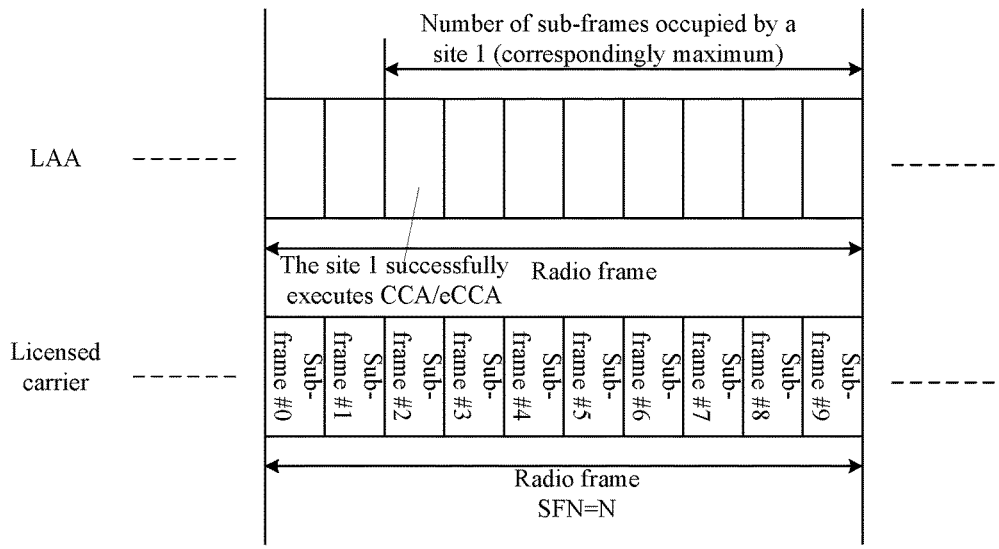
FIG. 3 is a schematic diagram of a scenario according to a first embodiment of the present disclosure.

When an unlicensed carrier (Licensed-Assisted Access (LAA) carrier shown in FIG. 3) and a licensed carrier are aggregated for operation, it is specified in LTE that a timing difference between the two carriers does not exceed 33 us, so that it may be considered that timing between the unlicensed carrier and the licensed carrier is aligned, that is, boundaries of sub-frames are aligned.

In the unlicensed carrier, frames are divided according to a frame length of 10 ms, and each frame may include 10 sub-frames of 1 ms. A data transmission site may support execution of CCA/eCCA in each sub-frame (eCCA usually refers to executing CCA for many times according to a certain rule) to compete for a right of using an unlicensed carrier. After the unlicensed carrier is successfully preempted by executing the CCA/eCCA (which means that the data transmission site acquires the right of using the unlicensed carrier after executing CCA/eCCA), a maximum occupied time length of the data transmission site starts from a sub-frame where CCA/eCCA is executed and ends till the end of the last sub-frame of the frame.

In FIG. 3, a data transmission site 1 needs to occupy 10 sub-frames according to a load requirement after successfully preempting an unlicensed carrier by executing CCA/eCCA in a third sub-frame of a radio frame. However, according to an implementation mode of the present disclosure, the data transmission site 1 may occupy at most 8 continuous sub-frames (including the sub-frame where CCA/eCCA is executed to a last sub-frame of the frame) in the frame. If the data transmission site 1 successfully preempts the unlicensed carrier by executing the CCA/eCCA in a first sub-frame of the frame, the data transmission site 1 may occupy 10 sub-frames (which is equivalent to that all of the sub-frames of the frame are occupied). If the load requirement of the data transmission site 1 is not completely met in the current frame, the data transmission site 1 is still required to continue preempting the unlicensed carrier in a next frame. When the data transmission site 1 preempts the unlicensed carrier in the next frame, the data transmission site 1 may perform preemption by virtue of CCA/eCCA with a higher preemption probability, that is, the data transmission site 1 is configured to have a high priority for preemption of the unlicensed carrier when preempting a resource in the next frame. Therefore, compared with another data transmission site, a probability (statistical probability) for the data transmission site 1 to preempt the unlicensed carrier in the next frame may be increased. There are many specific methods for increasing the probability, for example, reducing a number of eCCA execution times of the data transmission site or reducing a time length of each CCA during execution of eCCA.

If a time length (or sub-frame number) preempted by the data transmission site 1 in the frame meets its own load requirement, the data transmission site 1 will not be configured to execute CCA/eCCA with a relatively higher priority during preemption in the next frame.

The mode in the first embodiment is relatively favorable when the sub-frame where the data transmission site 1 successfully preempts the unlicensed carrier by executing the CCA/eCCA is at a late position of the frame. For example, the sub-frame where the data transmission site 1 successfully preempts the unlicensed carrier by executing the CCA/eCCA is a last sub-frame of the frame, at this moment, the data transmission site 1 may occupy only one sub-frame, and CCA/eCCA executed by the data transmission site 1 in the next frame has a high preemption success rate, which facilitates data sending of the data transmission site 1.

Second Embodiment

The second embodiment is mainly based on the first embodiment, and the only difference lies in the mode in which the data transmission site 1 acquires the unlicensed carrier in the next frame.

The data transmission site 1 does not execute CCA/eCCA in the next frame, and directly uses the remaining number of required sub-frames. For example, in the first embodiment, the data transmission site 1 requires 10 sub-frames according to the load requirement, but 8 sub-frames are occupied in the current frame, and two more sub-frames need to be occupied, then the data transmission site 1 directly occupies the first two sub-frames in the next frame without executing CCA/eCCA. Other data transmission sites are still required to execute CCA/eCCA in sub-frames of the next frame. Therefore, the data transmission site 1 directly occupies the first two sub-frames to send data, and it is impossible for the other data transmission site to preempt the first two sub-frames.

Such a mode is more direct, and the data transmission site 1 can preempt the remaining number of required sub-frames in the next frame for sure. In the first embodiment, it is not 100% sure that the data transmission site 1 successfully preempts the sub-frames in the next frame, a probability of successful preemption of the data transmission site 1 is only increased from statistical probability, but the first embodiment is more superior than the second embodiment in terms of fairness. The two modes have their respective advantages and disadvantages.

Third Embodiment

The third embodiment is mainly based on the first embodiment, and the only difference lies in the mode in which the data transmission site 1 acquires the unlicensed carrier in the next frame.

The data transmission site 1 still executes CCA/eCCA with the same probability as the other data transmission sites in the next frame. That is, when preempting the unlicensed carrier in the next frame, the data transmission site 1 has the same priority as the other data transmission sites, and will not enjoy a high priority to obtain the unlicensed carrier. Such a mode is unfavorable for data sending of the data transmission site 1 because the resource preempted by the data transmission site 1 in the current frame may not meet the sending load requirement and the time length of the occupied resource does not exceed regional control requirements. However, such a mode is favorable for fairness for the other data transmission sites, and may ensure preemption fairness for the other data transmission sites during preemption of each time.

Fourth Embodiment

The data transmission site 1 executes CCA/eCCA to preempt an unlicensed carrier resource in a sub-frame of a frame. If the data transmission site 1 successfully preempts the unlicensed carrier by executing the CCA/eCCA, the data transmission site 1 determines the number of sub-frames occupied by CCA/eCCA of this time according to the load requirement and the number of the remaining sub-frames in the frame. The principle is that the number of the occupied sub-frames is not allowed to exceed the number of the remaining sub-frames in the current frame. That is, the sub-frames preempted at one time are not allowed to cross frames.

If there are remaining sub-frames in the frame after preemption of the data transmission site 1, the other data transmission sites and the data transmission site 1 may still execute CCA/eCCA to preempt resources in the remaining sub-frames.

Fifth Embodiment

Figure 4:
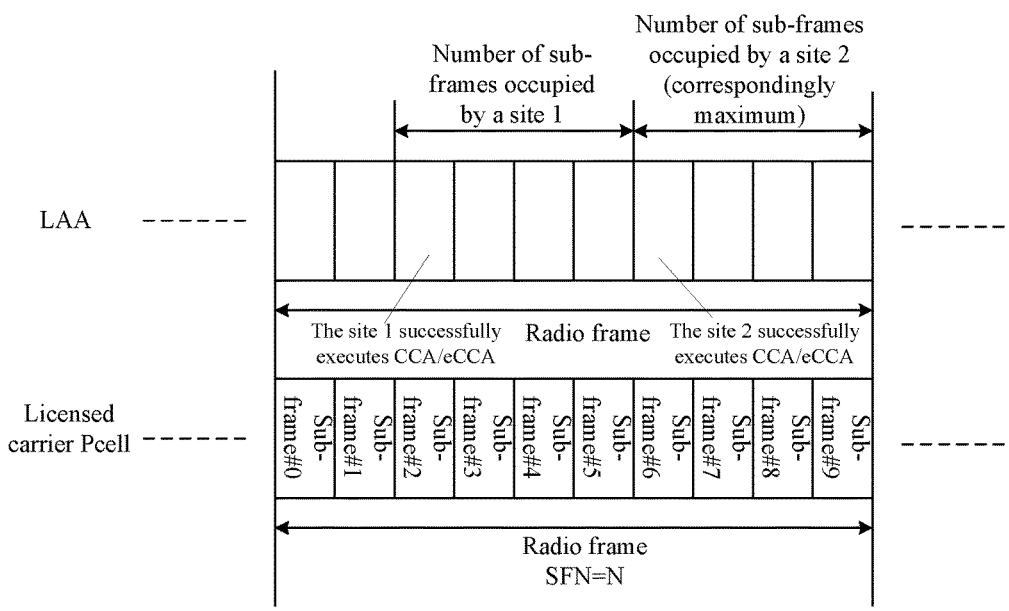
FIG. 4 is a schematic diagram of a scenario according to a fifth embodiment of the present disclosure.

Referring to FIG. 4, preemption of two data transmission sites for an unlicensed carrier resource in the same frame is shown. The data transmission site 1 successfully preempts an unlicensed carrier by executing CCA/eCCA in a third sub-frame, a load requirement of the data transmission site 1 is a relatively low, and the data transmission site 1 occupies 4 sub-frames according to the load requirement. Remaining resources in the frame may be continued to be preempted by the other data transmission sites. All the data transmission sites start preemption starting from a seventh sub-frame. At this moment, the data transmission site 2 successfully preempts the unlicensed carrier by executing CCA/eCCA in the seventh sub-frame, and then the data transmission site 2 determines the number of occupied sub-frames, which are at most 4 sub-frames (since there are at most 4 sub-frames left in the frame) and may also be fewer than 4 sub-frames, depending on a load condition. At this moment, a load requirement of the data transmission site 2 is exactly 4 sub-frames.

Such a mode allows each sub-frame of a frame to support CCA/eCCA, provides more opportunities for unlicensed carrier preemption of each data transmission site and avoids resource waste.

Sixth Embodiment

Figure 5:
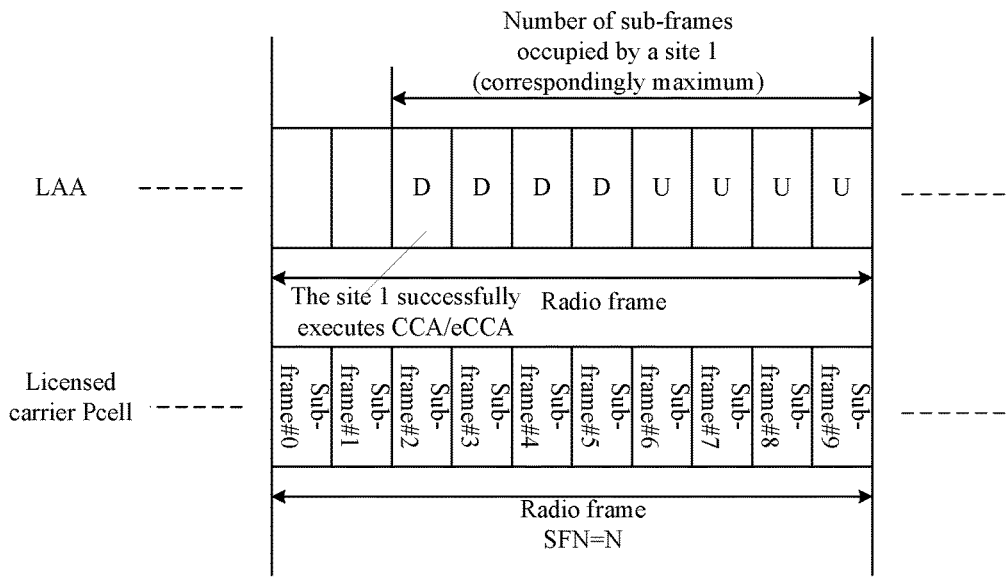
FIG. 5 is a schematic diagram of a scenario according to a sixth embodiment of the present disclosure.

Referring to FIG. 5, uplink sub-frame and downlink sub-frame allocation of occupied sub-frame resources after unlicensed carrier preemption of a data transmission site is shown.

A data transmission site 1 occupies 8 sub-frames after successfully preempting an unlicensed carrier by executing CCA/eCCA in a third sub-frame of a frame. Loads considered when these sub-frames are occupied include uplink loads and downlink loads. After occupation, the data transmission site 1 performs uplink and downlink sub-frame allocation on the 8 occupied sub-frames, sends uplink and downlink sub-frame allocation information to UE, and may specifically send uplink and downlink sub-frame allocation information to the UE through DCI. The positions of allocated uplink and downlink sub-frames may also be included. The data transmission site may allocate the number of the uplink sub-frames or downlink sub-frames to be 0 according to a load requirement. The sub-frame where CCA/eCCA is executed may be defined to be uplink or downlink, which refers to the above descriptions of the present disclosure.

Seventh Embodiment

With reference to the sixth embodiment, a data transmission site may also make an appointment about an allocation condition of the uplink and downlink sub-frames in the preempted sub-frames in advance with a receiver (or subordinate UE). For example, the data transmission site 1 makes an appointment about a relationship between the number of the sub-frames in resources occupied by the data transmission site and a configuration ratio of the uplink and downlink sub-frames and positions of the uplink sub-frames and the downlink sub-frames with the receiver. Then, the receiver may learn about specific uplink sub-frames and specific downlink sub-frames in the sub-frames occupied by the data transmission site 1 after learning about the number of the occupied sub-frames. The data transmission site may also make an appointment about the number of sub-frames occupied every time. For example, it may be specified that a data transmission site which succeeds in preemption in a sub-frame #0 occupies 4 sub-frames, a data transmission site which succeeds in preemption in a sub-frame #4 occupies 2 sub-frames and a data transmission site which succeeds in preemption in a sub-frame #6 occupies 4 sub-frames. In such a manner, occupied time length information may not be required to be notified to the receiver. When the occupied sub-frames include the uplink and downlink sub-frames, the downlink sub-frames are suggested to be placed before the uplink sub-frames. Therefore, such an evolved Node B scheduling-based mode is favorable for sending downlink grant, and avoids an idle sub-frame resource between uplink grant information and uplink data during direct uplink scheduling.

Eighth Embodiment

Figure 6:
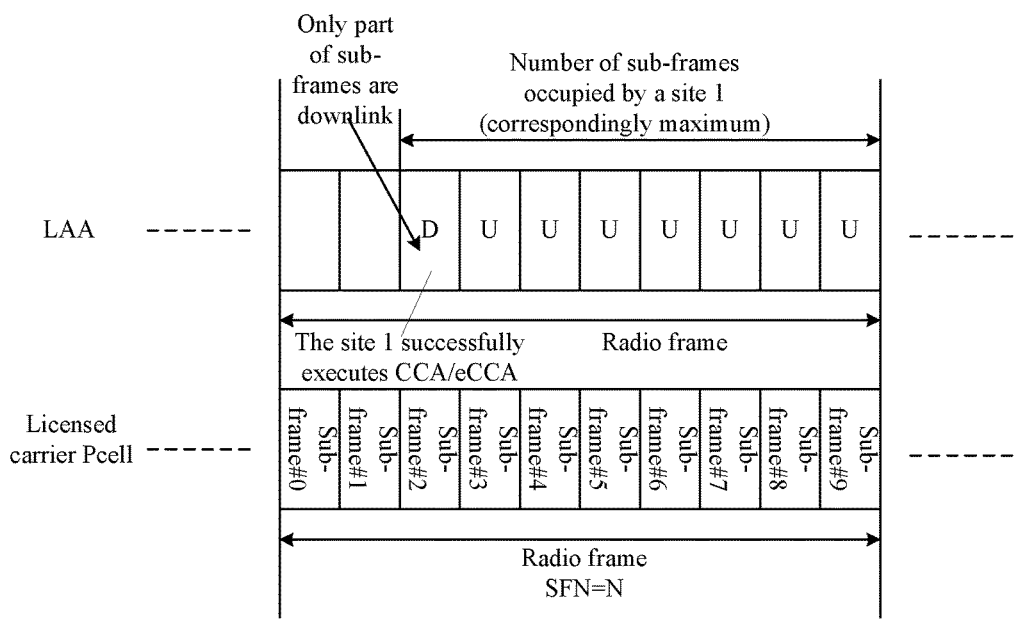
FIG. 6 is a schematic diagram of a scenario according to an eighth embodiment of the present disclosure.

Referring to FIG. 6, configuration of an occupied resource for an uplink sub-frame after a data transmission site preempts an unlicensed carrier is shown.

A data transmission site 1 occupies 8 sub-frames after successfully preempting an unlicensed carrier by executing CCA/eCCA in a third sub-frame of a frame. A load considered when these sub-frames are occupied is an uplink load. After occupation, the data transmission site 1 performs uplink data transmission by virtue of the 8 occupied sub-frames. The data transmission site 1 (which is supposed to be an evolved Node B) may send grant information to schedule subordinate UE to send uplink data in the pre-empted sub-frames; or the data transmission site 1 sends the grant information to the subordinate UE in advance, and triggers the UE to send the uplink data in the preempted sub-frames according to the grant information only after occupying the unlicensed carrier.

The sub-frame where CCA/eCCA is executed may be defined to be uplink or downlink, which refers to the above descriptions of the present disclosure.

Ninth Embodiment

Figure 7:
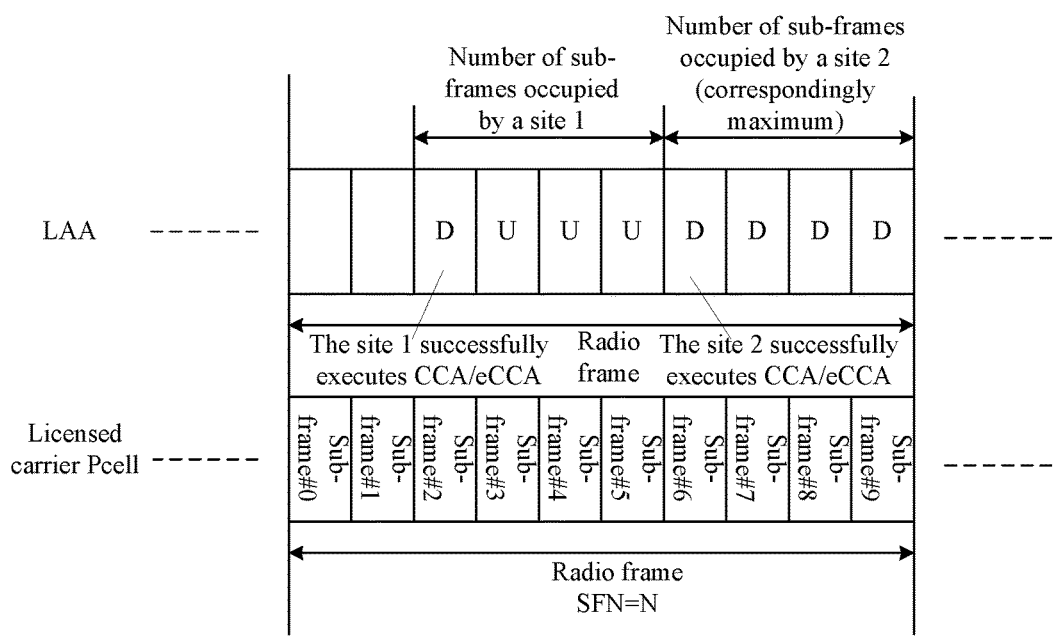
FIG. 7 is a schematic diagram of a scenario according to a ninth embodiment of the present disclosure.

Referring to FIG. 7, it may be specified that resources preempted every time by data transmission sites may only be an uplink or may also be downlink. In FIG. 7, a data transmission site 1 successfully preempts an unlicensed carrier by executing CCA/eCCA in a third sub-frame of a frame, and the data transmission site 1 occupies 4 sub-frames for uplink. A data transmission site 2 successfully preempts an unlicensed carrier by executing CCA/eCCA in a seventh sub-frame of the frame, and the data transmission site 2 occupies 4 sub-frames for downlink. It is specified in the embodiment that the resources preempted by the data transmission sites may only be configured for uplink or downlink and the preempted resources may not be configured for both downlink and uplink.

A sub-frame where CCA/eCCA is executed may be defined as an uplink or downlink sub-frame, which refers to the above descriptions of the present disclosure. A downlink signal, such as occupation information (or reserve information/retention information), uplink grant information and downlink synchronization information, is allowed to be sent in the sub-frame, and part or all of resources of the sub-frame may be adopted to send the signal.

Tenth Embodiment

As shown in FIG. 7, the data transmission site 2 successfully preempts the unlicensed carrier by executing the CCA/eCCA in the seventh sub-frame of the frame, the data transmission site 2 occupies the 4 sub-frames. The data transmission site 2 does not execute CCA/eCCA when using eighth, ninth and tenth sub-frames; while the other data transmission site is required to execute CCA/eCCA when being intended to use the eighth, ninth and tenth sub-frames. In such a manner, it may be ensured that the sub-frames occupied by the data transmission site 2 are used by the data transmission site 2.

Or, another data transmission site authorized or appointed by the data transmission site 2 is not required to execute CCA/eCCA when using a sub-frame occupied by the data transmission site 2. In such a mode, an evolved Node B which executes CCA/eCCA and preempts a resource may authorize another data transmission site or subordinate UE to use the resource, for example, for sending uplink data.

Or, when another data transmission site authorized or appointed by the data transmission site 2 uses a sub-frame occupied by the data transmission site 2, the data transmission site 2 sends signals at front parts of the sub-frame, and the other data transmission site authorized or appointed by the data transmission site sends signals by virtue of rest resources. Compared with the previous mode, such a mode considers that a signal sent by the subordinate UE may not be sensed by the other data transmission site if having relatively lower power. At this moment, the evolved Node B sends a channel reserve signal at starting symbols of the sub-frames to make the other data transmission sites know that the sub-frames have been occupied by a different data transmission site, and then the other data transmission sites may not use the sub-frames. Then, the subordinate UE may send uplink data in rest symbols.

Eleventh Embodiment

A CCA/eCCA execution time length is specified in a system. For example, CCA/eCCA in each sub-frame of a frame is started from a starting position of the sub-frame, and a total time length allocated for executing CCA/eCCA is fixed or is configurable. When the total time length allocated for executing CCA/eCCA is configurable, the system or a data transmission site may configure the time length for CCA/eCCA to be 1 to 7 OFDM symbols (of an LTE system). When the total time length allocated for executing CCA/eCCA is fixed, the system or the data transmission site may fixe the time length for execution of CCA/eCCA to maximally be 1 or 2 or 3 or 4 or 5 or 6 or 7 OFDM symbols (of the LTE system). For example, the total time length may be fixed to be 3 OFDM symbols. During execution, the data transmission site may successfully pre-empt an unlicensed carrier by executing CCA/eCCA at any time point in the three symbols, and then send a channel reserve signal or other data by virtue of time left in the three symbols. The data transmission site may also start sending a channel reserve signal at least to a first subsequent LTE OFDM symbol boundary from a successful preemption moment in the remaining time in the three symbols (the total time length for CCA/eCCA).

Twelfth Embodiment

A system may configure a time length of a data transmission frame. The system sets the time length of the frame to be 1 to 10 ms, and the system may configure an optimal frame time length according to unlicensed carrier control requirements of different regions and a specific control requirement, so that the system may efficiently work in the corresponding region. For example, in a region of Europe, a data transmission site of a radio communication system is specified in unlicensed carrier control to preempt an unlicensed carrier for maximally 10 ms every time. According to such a requirement, the system may configure a time length of a frame to be 10 ms, and the unlicensed carrier is preempted for use according to the modes in the abovementioned embodiments. In a region of Japan, a data transmission site of a radio communication system is specified in unlicensed carrier control to preempt an unlicensed carrier for maximally 4 ms every time. The system may configure a time length of a frame to be 4 ms, and the unlicensed carrier is preempted for use according to the modes in the abovementioned embodiments. When the time length of the frame is configured to be 1 ms, the data transmission site may occupy only one sub-frame (the sub-frame is 1 ms) during preemption of each time. The system may semi-statically change the length of the frame and preferably configure lengths of the frame for adjacent data transmission sites of the same system to be kept consistent. In such a manner, the adjacent data transmission sites may compete for unlicensed carriers more fairly.

Thirteenth Embodiment

After successfully preempting an unlicensed carrier, a data transmission site 1 determines the number of occupied sub-frames, indicates types of the occupied sub-frames, and notifies an appointed receiver or subordinate UE to use the sub-frames according to the indicated types. For example, the receiver or the subordinate UE receives or sends data (including control, data, a reference signal, feedback, ACK information and the like) on the occupied sub-frames. Indicating the types of the occupied sub-frames refers to that the data transmission site 1 is suggested to determine whether the occupied sub-frames (all) are configured for uplink or configured for downlink according to a load requirement after preempting the sub-frames of the unlicensed carrier according to a load. Then, the receiver or the subordinate UE receives or sends the data in the sub-frames occupied by the data transmission site 1 according to received signaling or an appointed manner.

When the types of the occupied sub-frames are indicated, if there exist sub-frames of a special type, such as a special sub-frame in an existing LTE Time Division Duplex (TDD) system, the sub-frames include downlink, uplink and guard intervals. Such a type may be recorded to be uplink, and may also be recorded to be downlink. However, it is needed to notify the receiver or the subordinate UE of or make an appointment about positions of the sub-frames of this type, similarly hereinafter.

Or, after successfully preempting the unlicensed carrier, the data transmission site 1 determines the number of the occupied sub-frames, indicates a proportion between different types of occupied sub-frames and positions of the occupied sub-frames, and notifies the appointed receiver or the subordinate UE to use the sub-frames according to indicated types. For example, the receiver or the subordinate UE receives or sends the data (including control, the data, the reference signal, the feedback, the ACK information and the like) on the occupied sub-frames. The process of indicating a proportion between different types of occupied sub-frames and positions of the occupied sub-frames is described below. The data transmission site 1 determines which sub-frames are configured for uplink and which sub-frames are configured for downlink in the occupied sub-frames according to the load requirement after preempting the sub-frames of the unlicensed carrier according to the load. In this process, there is at least 0 sub-frame allowed to be configured for downlink or uplink. Then, the receiver or the subordinate UE receives or sends the data in the sub-frames occupied by the data transmission site 1 according to the received signaling or the appointed manner.

Fourteenth Embodiment

The fourteenth embodiment is based on the thirteenth embodiment. The data transmission site 1 may notify the receiver or the subordinate UE through DCI or UCI. For example, the data transmission site 1 makes an appointment about meanings of bits in the DCI or the UCI with the receiver or the subordinate UE to notify the types of the sub-frames occupied by the data transmission site 1 or a proportion between different types of occupied sub-frames and positions of the occupied sub-frames.

The data transmission site 1 may also notify, in a sub-frame where CCA/eCCA is executed, the receiver or the subordinate UE of types of the occupied sub-frames, or a proportion between different types of occupied sub-frames and positions of the occupied sub-frames, or the number of the occupied sub-frames, or information (such as frequency point information) of the unlicensed carrier occupied by the data transmission site.

The data transmission site 1 may further implicitly notify, through a channel reserve signal or one or more appointed sequences in a DRS, PSS/SSS, CRS, CSI-RS and PRS sent in the sub-frame where CCA/eCCA is executed, the receiver or the subordinate UE of types of the occupied sub-frames, or a proportion between different types of occupied sub-frames and positions of the occupied sub-frames, or the number of the occupied sub-frames, or information of the unlicensed carrier occupied by the data transmission site. For complexity reduction, a system may specify a sending type of abovementioned signals, for example, the CRS and the PRS are fixedly sent, and in such a manner, the UE may perform detection according to patterns of the CRS and the PRS mapped in Physical Resource Blocks (PRBs) of the sub-frames. For symbols incapable of sending the CRS, the PRS or the abovementioned signals (these symbols may be missed by CCA/eCCA execution of the data transmission site), the signals in these symbols are directly deleted.

The system may also compile various conditions (or part of valuable conditions) of the number, types and positions of the occupied sub-frames into a table form, and the data transmission site 1 and the receiver or the subordinate UE both perform determination according to the table. For example, the data transmission site 1 may only describe corresponding numbers in the table in the abovementioned modes, and the receiver or the subordinate UE may query the table to learn about the number, types and positions of the sub-frames according to the numbers, so that signaling overhead is reduced.

Fifteenth Embodiment

A frame structure of a system, which is 10 ms, may include 10 sub-frames of 1 ms. If the system is deployed in a certain region, control of this region over unlicensed carriers run by the system requires that a maximum time length for a data transmission site to preempt an unlicensed carrier every time is 4 ms and is smaller than a length of the frame, and then the data transmission site executes the following manner.

After the data transmission site successfully preempts the unlicensed carrier by executing the CCA/eCCA in a sub-frame of a frame, the maximum number of sub-frames occupied by the data transmission site is determined to be a smaller value in following two values: till the end of the frame; or a maximum time length (1 ms corresponds to one sub-frame) required by local control under the condition of not exceeding the current frame.

For example, in the region, after the data transmission site successfully preempts the unlicensed carrier by executing the CCA/eCCA in a fourth sub-frame of the frame, the sub-frames occupied by the data transmission site may maximally be 4 sub-frames (4 ms, including fourth, fifth, sixth and seventh sub-frames).

In a region of Europe, it is specified in control requirements that a maximum time length for a data transmission site to preempt an unlicensed carrier every time is 10 ms. After the data transmission site successfully preempts the unlicensed carrier by executing the CCA/eCCA in a fourth sub-frame of a frame, sub-frames occupied by the data transmission site may maximally be 7 sub-frames (fourth, fifth, sixth, seventh, eighth, ninth and tenth sub-frames are occupied).

Sixteenth Embodiment

When a data transmission site is UE, after the UE successfully preempts an unlicensed carrier by executing CCA/eCCA, the UE determines the number of occupied sub-frames after preempting the unlicensed carrier, determines a proportion between different types of sub-frames and positions of the sub-frames, and notifies the information to an evolved Node B to which the UE belongs in any of the following manners.

In a first manner, after UE1 successfully preempts an unlicensed carrier by executing CCA/eCCA, the UE1 determines the number of occupied sub-frames according to an uplink load requirement (data sent to the evolved Node B by the UE), and then sends uplink data to the evolved Node B in the occupied sub-frames. In such a manner, the sub-frames preempted by the UE are only configured for uplink. As an optional implementation, UCI may not be sent to notify the evolved Node B of information about the number of the sub-frames and types, proportion and positions of the sub-frames.

In a second manner, after UE2 successfully preempts an unlicensed carrier by executing CCA/eCCA, the UE2 determines the number of occupied sub-frames and types, proportion and positions of the sub-frames according to an uplink load requirement and a downlink load requirement (downlink loads are estimated by the UE2 or notified by the evolved Node B), and then notifies the evolved Node B of the above information. In the embodiment, UCI is adopted for notification on a licensed carrier or the unlicensed carrier. In the embodiment, in the occupied sub-frames uplink sub-frames are positioned at front parts, downlink sub-frames are positioned at rear parts, and the UE2 may send uplink data in the uplink sub-frames. Then, the evolved Node B sends downlink data to the UE2 in the downlink sub-frames, or the evolved Node B may also send downlink data of other UE by virtue of the downlink sub-frames. In such a manner, the UE2 preempts unlicensed carrier resources, and then use part of them by itself or may also not use them by itself but notify the evolved Node B to which the UE2 belongs to use the preempted unlicensed carrier resources.

All or part of the abovementioned embodiments may be combined for use under the condition of no conflicts.

Each unit may be implemented by a Central Processing Unit (CPU), Digital Signal Processor (DSP) or Field-Programmable Gate Array (FPGA) in electronic equipment.

An embodiment of the present disclosure provides a computer storage medium, in which a computer-executable instruction is stored, the computer-executable instruction being configured to execute at least one of the abovementioned data transmission methods, for example, the method shown in FIG. 1 and/or FIG. 2.

The computer storage medium may include storage media of various types such as a hard disk, an optical disk and a hard disk, and is optionally a non-transitory storage medium.

Those skilled in the art should know that the embodiment of the present disclosure may be provided as a method, a system or a computer program product. Therefore, the present disclosure may adopt a form of hardware embodiment, software embodiment and combined software and hardware embodiment. Moreover, the present disclosure may adopt a form of computer program product implemented on one or more computer-readable storage media (including, but not limited to, a disk memory and an optical memory) including computer-readable program codes.

The present disclosure is described with reference to flowcharts and/or block diagrams of the method, equipment (system) and computer program product according to the embodiment of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating acts are executed on the computer or the other programmable data processing equipment to generate processing implemented by the computer, and acts for realizing the function specified in one flow or many flows in the flowcharts and/or one block or many blocks in the block diagrams are provided by the instructions executed on the computer or the other programmable data processing equipment.

The above is only the preferred embodiment of the present disclosure and not intended to limit the scope of protection of the present disclosure. Modifications made according to the principle of the present disclosure shall be understood to fall within the scope of protection defined by the appended claims of the present disclosure.

What is claimed is:

1. A data transmission method, comprising:
   determining a sub-frame occupation strategy after a data transmission site successfully preempts an unlicensed carrier by executing Clear Channel Assessment or Extended Clear Channel Assessment (CCA/eCCA); and
   performing data transmission according to the sub-frame occupation strategy;
   when an occupation time length requirement of the data transmission site exceeds the last sub-frame of a frame after the data transmission site successfully preempts the unlicensed carrier by executing the CCA/eCCA in a sub-frame of the frame, executing, by the data transmission site, one of the following acts:
   executing CCA/eCCA in the first sub-frame of a next frame of the frame, and at this moment, executing, by the data transmission site, specific CCA/eCCA with a preemption probability higher than a preemption probability of other data transmission sites;

directly occupying remaining sub-frames in a next frame of the frame; and re-executing CCA/eCCA for preemption in a next frame of the frame by using a preemption probability the same as a preemption probability of other data transmission sites.

2. The method as claimed in claim 1, wherein each sub-frame of a frame supports CCA/eCCA, and after the unlicensed carrier is successfully preempted by executing the CCA/eCCA according to a time sequence in the frame, the maximum number of sub-frames occupied by the data transmission site is determined to be a smaller value in following two values:
   a number of sub-frames till the end of the frame; and
   a number of sub-frames corresponding to a maximum time length of a single CCA/eCCA required by local control,
   wherein the frame comprises a frame for data transmission configured by a system, a maximum time length of the frame is 10 ms, and a minimum time length of the frame is 1 ms.

3. The method as claimed in claim 1, wherein
   the sub-frame occupation strategy comprises one or more of: a number of occupied sub-frames, types of occupied sub-frames, a proportion between different types of occupied sub-frames, and positions of occupied sub-frames, and
   the data transmission comprises receiving data and/or sending data.

4. The method as claimed in claim 1, wherein determining the sub-frame occupation strategy after the data transmission site successfully preempts the unlicensed carrier by executing the CCA/eCCA comprises:
   after the data transmission site successfully preempts the unlicensed carrier by executing the CCA/eCCA in the last sub-frame of a frame, determining to occupy a current sub-frame;
   or,
   when the data transmission site successfully preempts the unlicensed carrier by executing the CCA/eCCA in a sub-frame of a frame and a corresponding number of sub-frames occupied by the data transmission site according to a load requirement does not exceed the frame, occupying, by the data transmission site, the corresponding number of sub-frames according to the load requirement;
   or,
   after the data transmission site successfully preempts the unlicensed carrier by executing the CCA/eCCA in a sub-frame of a frame, determining occupied sub-frames, and determining a number of uplink sub-frames and a number of downlink sub-frames in the occupied sub-frames according to an uplink load requirement and a downlink load requirement;
   or,
   after the data transmission site successfully preempts the unlicensed carrier by executing the CCA/eCCA in a sub-frame of a frame, determining occupied sub-frames, and determining the occupied sub-frames to be only downlink sub-frames or only uplink sub-frames;
   or,
   after the data transmission site successfully preempts the unlicensed carrier by executing the CCA/eCCA in a sub-frame of a frame, allowing a downlink signal and/or an uplink signal to be sent in the sub-frame, wherein resources for sending the downlink signal or the uplink signal are part or all of time resources in resources of the sub-frame which are obtained by successfully executing the CCA/eCCA, or are part or all of time resources in the sub-frame except resources obtained by executing the CCA/eCCA.

5. The method as claimed in claim 1, wherein determining the sub-frame occupation strategy after the data transmission site successfully preempts the unlicensed carrier by executing the CCA/eCCA comprises: after the data transmission site successfully preempts the unlicensed carrier by executing the CCA/eCCA in a sub-frame of a frame, determining occupied sub-frames, and determining that the data transmission site is not required to execute CCA/eCCA before subsequently using the occupied sub-frames;
   or, determining that another data transmission site authorized or appointed by the data transmission site is not required to execute CCA/eCCA when using a sub-frame occupied by the data transmission site;
   or, when another data transmission site authorized or appointed by the data transmission site uses a sub-frame occupied by the data transmission site, sending, by the data transmission site, signals at front parts of the sub-frame, and sending, by the other data transmission site authorized or appointed by the data transmission site, signals by virtue of rest resources;
   or, executing, by another data transmission site authorized or appointed by the data transmission site, specific CCA/eCCA with a preemption probability higher than other data transmission sites when using a sub-frame occupied by the data transmission site.

6. The method as claimed in claim 1, wherein CCA/eCCA in each sub-frame of the frame is started from a starting position of the sub-frame, and a total time length allocated for execution of CCA/eCCA is fixed or is configurable; when the total time length allocated for execution of CCA/eCCA is configurable, the total time length is configured to be 1 to M Orthogonal Frequency Division Multiplexing (OFDM) symbols, where a value of M is any natural number within a range of 4 to 7; and when the total time length allocated for execution of CCA/eCCA is fixed, the total time length is fixed to be 2 or 3 or 4 OFDM symbols.

7. The method as claimed in claim 6, wherein the total time length further comprises that: when there is remaining time in the total time length after the data transmission site successfully executes CCA/eCCA, the data transmission site sends a channel reserve signal from a successful preemption moment at least to a first subsequent OFDM symbol boundary; or a time length during which the data transmission site sends a channel reserve signal from the successful preemption moment at least to a first subsequent OFDM symbol boundary is smaller than 4 microseconds or 9 microseconds or 18 microseconds or 20 microseconds.

8. The method as claimed in claim 1, further comprising:
   determining, by the data transmission site, occupied sub-frames, wherein the occupied sub-frames are determined to be: uplink or downlink sub-frames, or a proportion of uplink and downlink sub-frames in the sub-frames occupied by the data transmission site;
   or,
   appointing, by the data transmission site, the occupied sub-frames to be uplink or downlink sub-frames or a proportion and positions of uplink and downlink sub-frames when the occupied sub-frames comprise both the uplink and downlink sub-frames in advance with subordinate User Equipment (UE) or an appointed user;
   or, semi-statically changing a length of a frame, and configuring lengths of the frame for adjacent data transmission sites of the same system to be kept consistent.

9. The method as claimed in claim 1, further comprising: notifying, by the data transmission site, a receiver or a subordinate UE of the sub-frame occupation strategy.

10. The method as claimed in claim 9, wherein notifying, by the data transmission site, the receiver or the subordinate UE of the sub-frame occupation strategy comprises:
  notifying, by the data transmission site, the receiver or the subordinate UE that the sub-frames occupied by the data transmission site are downlink sub-frames or uplink sub-frames, and receiving or sending, by the receiver or the subordinate UE, data in the sub-frames occupied by the data transmission site;
  or,
  notifying, by the data transmission site, the receiver or the subordinate UE of specific uplink sub-frames and downlink sub-frames in the sub-frames occupied by the data transmission site, and using, by the receiver or the subordinate UE, the corresponding sub-frames for receiving or sending according to a proportion and positions of the notified uplink and downlink sub-frames based on signaling or an appointment;
  or,
  notifying, by the data transmission site, the receiver or the subordinate UE of the sub-frame occupation strategy through bit information in Downlink Control Information (DCI) or Uplink Control Information (UCI);
  or,
  notifying, by the data transmission site in the sub-frame where CCA/eCCA is executed, the receiver or the subordinate UE of types of the occupied sub-frames, or a proportion between different types of occupied sub-frames and positions of the occupied sub-frames, or a number of the occupied sub-frames, or information of the unlicensed carrier occupied by the data transmission site
  or,
  implicitly notifying, by the data transmission site through a channel reserve signal or appointed subsequences of one or more of a Dedicated Reference Signal (DRS), Primary Synchronization Signal/Secondary Synchronization Signal (PSS/SSS), Cell specific Reference Signal (CRS), Channel State Information Reference Signal (CSI-RS) and Positioning Reference Signal (PRS) sent in the sub-frame where CCA/eCCA is executed, the receiver or the subordinate UE of types of the occupied sub-frames, or a proportion between different types of occupied sub-frames and positions of the occupied sub-frames, or a number of the occupied sub-frames, or information of the unlicensed carrier occupied by the data transmission site.

11. A data transmission method, comprising:
  receiving, by a receiver, a strategy;
  performing data transmission according to the strategy, wherein the strategy is sent from a data transmission site and is a strategy for uplink and/or downlink transmission within a carrier;
  wherein the data transmission site, when an occupation time length requirement of the data transmission site exceeds the last sub-frame of a frame after the data transmission site successfully preempts the unlicensed carrier by executing the CCA/eCCA in a sub-frame of the frame, Is configured to execute one of the following acts;
    executing CCA/eCCA in the first sub-frame of a next frame of the frame, and at this moment, executing, by the data transmission site, specific CCA/eCCA with a preemption probability higher than a preemption probability of other data transmission sites;
    directly occupying remaining sub-frames in a next frame of the frame; and
    re-executing CCA/eCCA for preemption in a next frame of the frame by using a preemption probability the same as a preemption probability of other data transmission sites.

12. The method as claimed in claim 11, wherein the strategy satisfies one of the following conditions:
  the strategy is used for notifying the receiver that scheduling units adopted by the data transmission site are downlink scheduling units or uplink scheduling units, and the receiver receives or sends data based on signaling or an appointment in the scheduling units adopted by the data transmission site;
  the strategy is used for notifying the receiver which scheduling units are uplink scheduling units and which scheduling units are downlink scheduling units in scheduling units adopted by the data transmission site, and according to a proportion and positions of the uplink scheduling units and the downlink scheduling units, the receiver receives or sends data based on signaling or an appointment in corresponding scheduling units.

13. The method as claimed in claim 11, wherein when the receiver receives the strategy, the method comprises: the receiver receives the strategy, parses the strategy, and determines whether scheduling units are used for uplink data transmission or downlink data transmission according to indication of the strategy.

14. The method as claimed in claim 11, wherein the strategy comprises one or more of: a number of occupied scheduling units, types of occupied scheduling units, a proportion between different types of occupied scheduling units, and positions of occupied scheduling units.

15. The method as claimed in claim 11, wherein receiving, by the receiver, the strategy comprises: receiving, by the receiver, the strategy through bit information in Downlink Control Information (DCI) or Uplink Control Information (UCI).

16. The method as claimed in claim 11, wherein the receiver learns about types of scheduling units configured by the data transmission site, or a proportion between different types of scheduling units and positions of the scheduling units, or a number of scheduling units.

17. The method as claimed in claim 11, wherein when the receiver receives the strategy information, the method further comprises: parsing, by the receiver through a channel reserve signal or appointed subsequences of one or more of a Dedicated Reference Signal (DRS), Primary Synchronization Signal/Secondary Synchronization Signal (PSS/SSS), Cell specific Reference Signal (CRS), Channel State Information Reference Signal (CSI-RS) and Positioning Reference Signal (PRS) sent in the sub-frame where CCA/eCCA is executed, types of scheduling units configured by the data transmission site, or a proportion between different types of scheduling units and positions of the scheduling units, or a number of scheduling units.

18. The method as claimed in claim 11, wherein the strategy satisfies one of the following conditions:
  after the data transmission site successfully preempts an unlicensed carrier by executing CCA/eCCA in a scheduling unit of a frame, determining occupied scheduling units, and determining that the data transmission site is not required to execute CCA/eCCA before subsequently using the occupied scheduling units;

or, determining that another data transmission site authorized or appointed by the data transmission site is not required to execute CCA/eCCA when using a scheduling unit occupied by the data transmission site;

or, when another data transmission site authorized or appointed by the data transmission site uses a scheduling unit occupied by the data transmission site, sending, by the data transmission site, signals at front parts of the scheduling unit, and sending, by the other data transmission site authorized or appointed by the data transmission site, signals by virtue of rest resources;

or, executing, by another data transmission site authorized or appointed by the data transmission site, specific CCA/eCCA with a preemption probability higher than other data transmission sites when using a scheduling unit occupied by the data transmission site;

wherein the other data transmission site comprises: a base station, a UE, a home base station, or a relay station.

19. A data transmission method, comprising:

when a data transmission site determines to use a carrier to perform data transmission, configuring, by the data transmission site, a strategy for uplink and/or downlink transmission within the carrier, and performing data transmission according to the strategy;

when an occupation time length requirement of the data transmission site exceeds the last sub-frame of a frame after the data transmission site successfully preempts the unlicensed carrier by executing the CCA/eCCA in a sub-frame of the frame, executing, by the data transmission site, one of the following acts;

executing CCA/eCCA in the first sub-frame of a next frame of the frame, and at this moment, executing, by the data transmission site, specific CCA/eCCA with a preemption probability higher than a preemption probability of other data transmission sites;

directly occupying remaining sub-frames in a next frame of the frame; and re-executing CCA/eCCA for preemption in a next frame of the frame by using a preemption probability the same as a preemption probability of other data transmission sites.

20. A receiver, comprising a hardware processor arranged to:

receive a strategy;

perform data transmission according to the strategy, wherein the strategy is sent from a data transmission site and is a strategy for uplink and/or downlink transmission within a carrier;

wherein the data transmission site, when an occupation time length requirement of the data transmission site exceeds the last sub-frame of a frame after the data transmission site successfully preempts the unlicensed carrier by executing the CCA/eCCA in a sub-frame of the frame, Is configured to execute one of the following acts:

executing CCA/eCCA in the first sub-frame of a next frame of the frame, and at this moment, executing, by the data transmission site, specific CCA/eCCA with a preemption probability higher than a preemption probability of other data transmission sites;

directly occupying remaining sub-frames in a next frame of the frame; and re-executing CCA/eCCA for preemption in a next frame of the frame by using a preemption probability the same as a preemption probability of other data transmission sites.

* * * * *